US00RE46787E

(19) United States
(12) Reissued Patent
Safford

(10) Patent Number: US RE46,787 E
(45) Date of Reissued Patent: Apr. 17, 2018

(54) GLOVE WITH INDEX FINGER GRIP AND IMPACT GUARD

(71) Applicant: Mechanix Wear, Inc., Valencia, CA (US)

(72) Inventor: Kenny Safford, Simi Valley, CA (US)

(73) Assignee: Mechanix Wear, Inc., Valencia, CA (US)

(21) Appl. No.: 29/502,024

(22) Filed: Sep. 10, 2014

Related U.S. Patent Documents

Reissue of:
(64) Patent No.: Des. 667,171
Issued: Sep. 11, 2012
Appl. No.: 29/393,751
Filed: Jun. 8, 2011

(51) LOC (11) Cl. ..... 02-06
(52) U.S. Cl.
USPC ..... D29/117.1
(58) Field of Classification Search
USPC ..... D2/610, 616, 617, 618, 619, 620, 621, D2/622, 623; D21/807; D28/63; D29/113, 114, 116.2, 117.1, 117.2; 2/16, 2/159, 161.3, 161.6, 161.7, 161.8
See application file for complete search history.

(56) References Cited

U.S. PATENT DOCUMENTS

| | | | | | |
|---|---|---|---|---|---|
| 2,025,357 | A | * | 12/1935 | Pagan | 2/16 |
| 3,597,765 | A | * | 8/1971 | Stanton | 2/161.3 |
| 3,882,548 | A | | 5/1975 | Shinagawa | |
| 3,918,096 | A | * | 11/1975 | Lim | 2/161.1 |
| D268,968 | S | * | 5/1983 | Sami | D29/117.1 |
| 4,864,660 | A | * | 9/1989 | Sawyer | 2/20 |
| 5,067,175 | A | * | 11/1991 | Gold | 2/16 |
| D461,620 | S | * | 8/2002 | Bevier | D2/623 |
| 6,732,377 | B1 | * | 5/2004 | Wilkinson | 2/161.4 |
| D490,966 | S | * | 6/2004 | Sasaki | D2/623 |
| D516,277 | S | * | 3/2006 | Mattesky | D2/619 |
| D589,678 | S | * | 4/2009 | Lawrence | D2/617 |

(Continued)

FOREIGN PATENT DOCUMENTS

KR 300416270.0000 * 6/2006

OTHER PUBLICATIONS

Mechanix Wear "M-Pact Glove," as shown on-line at http://www.mechanix.com/m-pact-glove. Downloaded from the Internet on Jul. 15, 2012. (5 pages).

*Primary Examiner* — Philip S Hyder
(74) *Attorney, Agent, or Firm* — Knobbe, Martens, Olson & Bear, LLP

(57) CLAIM

The ornamental design for a "glove with index finger grip and impact guard," as shown and described.

DESCRIPTION

FIG. 1 is a perspective view of a glove with index finger grip and impact guard, showing my new design.
FIG. 2 is a front elevational view thereof;
FIG. 3 is a rear elevational view thereof;
FIG. 4 is a left side elevational view thereof
FIG. 5 is a right side elevational view thereof;
FIG. 6 is a top plan view thereof; and,
FIG. 7 is a bottom plan view thereof.
The broken lines shown in the drawings on the design illustrate features of the article to which the design is applied that form no part of the claim. The broken-line oval shown in FIG. 7 that defines the bounds of the claimed design forms no part thereof.

1 Claim, 5 Drawing Sheets

Figure 4:
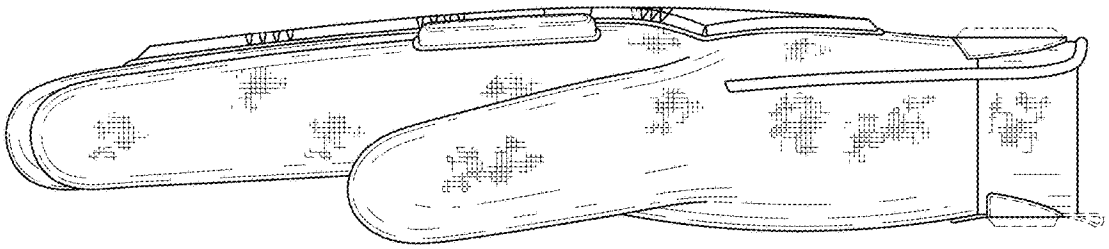
Figure 6:
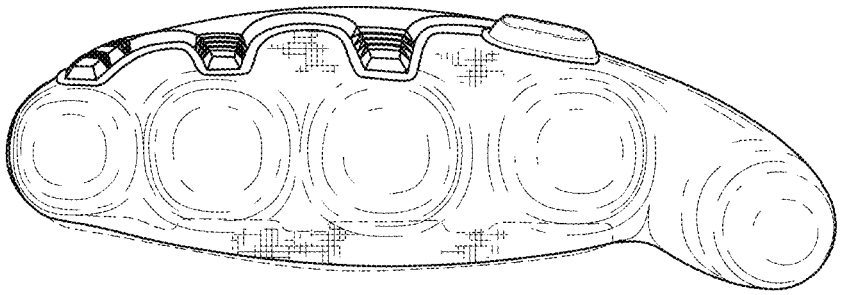
Figure 7:
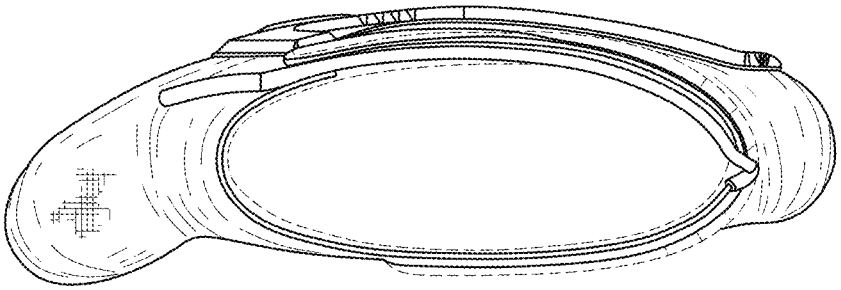

Matter enclosed in heavy brackets [ ] appears in the original patent but forms no part of this reissue; matter printed in italics indicates the additions made by reissue.

Amended

(56) References Cited

U.S. PATENT DOCUMENTS

| | | | | | |
|---|---|---|---|---|---|
| D604,027 | S | * | 11/2009 | Kleinert | D2/617 |
| D608,978 | S | * | 2/2010 | Votel | D2/617 |
| D621,553 | S | * | 8/2010 | Fitzgerald et al. | D29/113 |
| D625,051 | S | * | 10/2010 | Fitzgerald et al. | D29/113 |
| D653,427 | S | * | 2/2012 | Wong | D2/619 |
| 2010/0192279 | A1 | * | 8/2010 | Hunsicker | 2/161.2 |

* cited by examiner

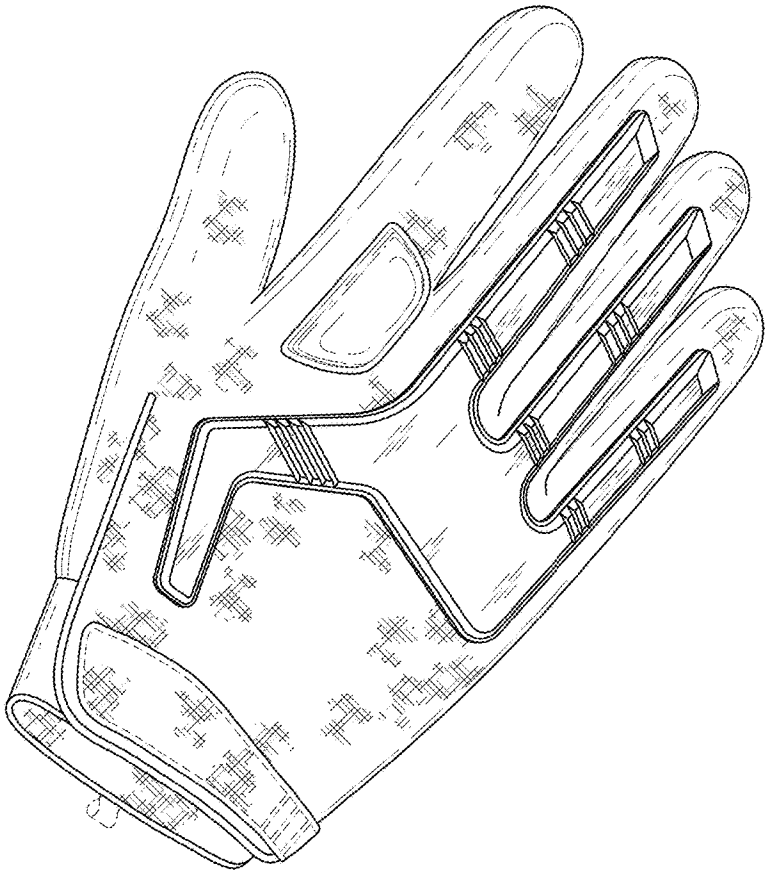
*FIG. 1*
Amended

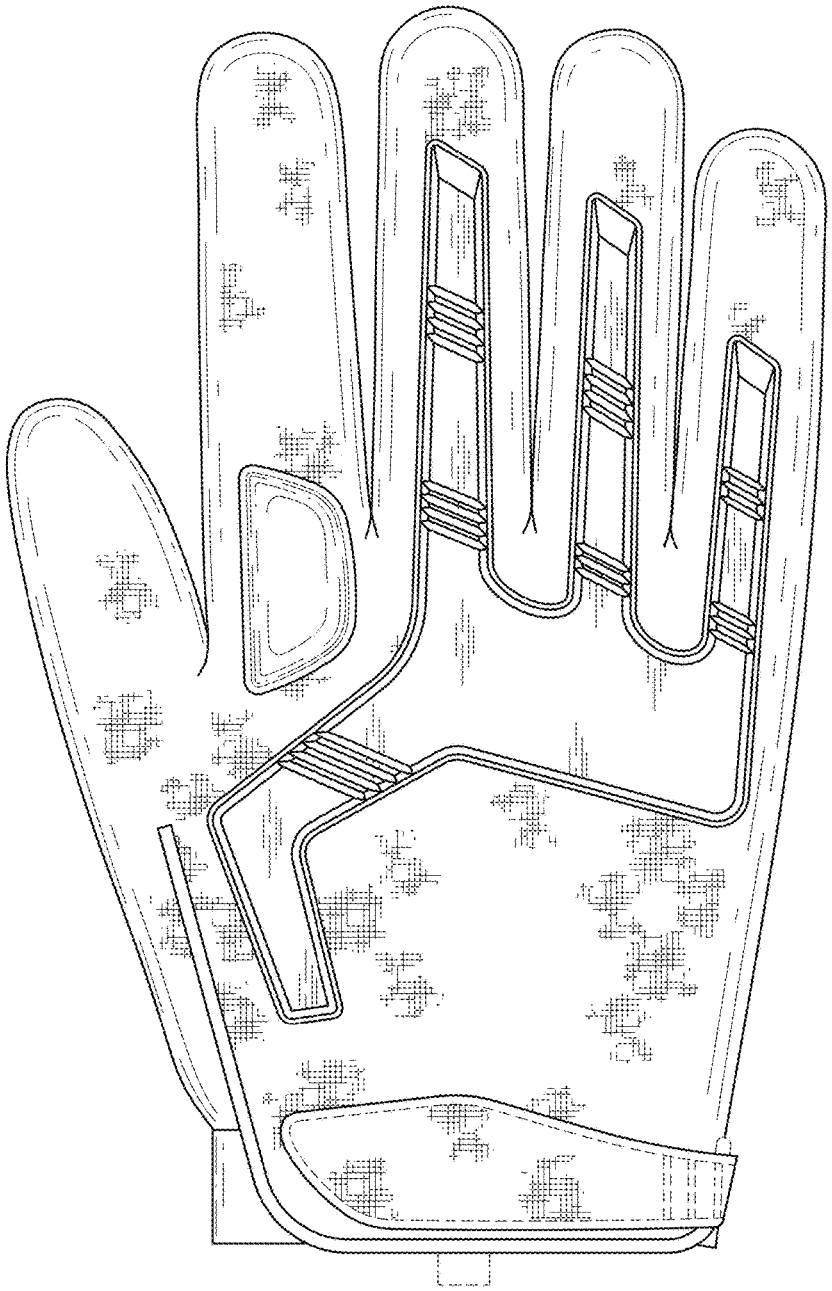
*FIG. 2*
Amended

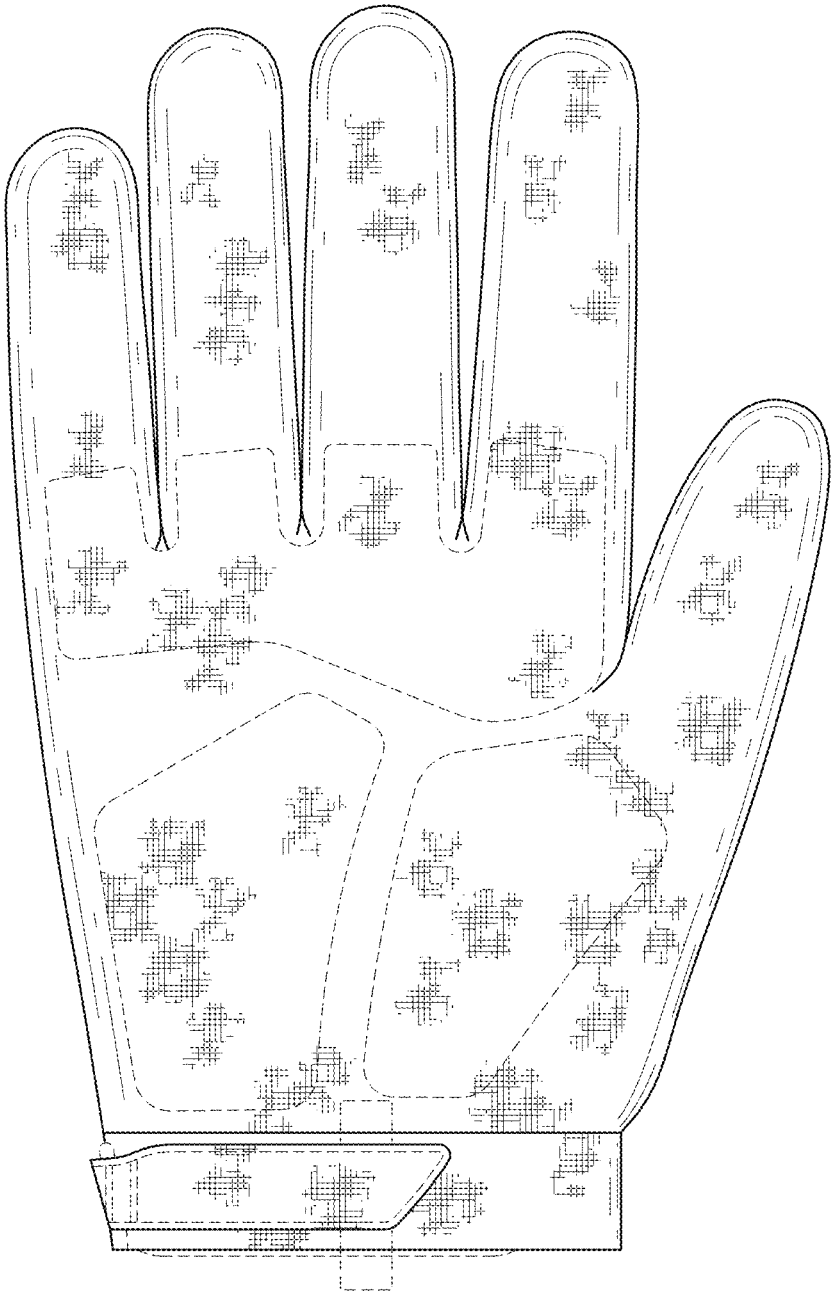
*FIG. 3*
Amended

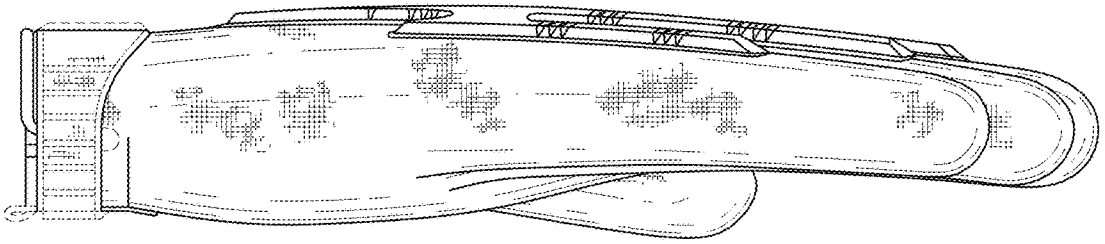
FIG. 5
Amended